United States Patent [19]

Farkas

[11] Patent Number: 5,300,584
[45] Date of Patent: Apr. 5, 1994

[54] LOW VISCOSITY DIPRIMARY AMINE REACTIVE MODIFIERS FOR EPOXY RESINS

[75] Inventor: Julius Farkas, Westlake, Ohio

[73] Assignee: The B.F. Goodrich Company, Akron, Ohio

[21] Appl. No.: 947,078

[22] Filed: Sep. 17, 1992

Related U.S. Application Data

[63] Continuation of Ser. No. 649,274, Jan. 30, 1991, abandoned, which is a continuation of Ser. No. 304,434, Jan. 31, 1989, abandoned.

[51] Int. Cl.$^5$ .................. C08F 36/00; C08F 236/00
[52] U.S. Cl. .................. 525/329.3; 525/113; 528/111; 528/118; 528/123; 544/357; 546/189; 546/190; 564/156; 564/160; 560/205
[58] Field of Search ............. 525/113, 329.3; 528/111, 118, 123; 560/205; 544/357; 546/189, 190; 548/266, 268; 564/156, 160

[56] References Cited

U.S. PATENT DOCUMENTS

| | | | |
|---|---|---|---|
| 3,257,342 | 6/1966 | Kwong | 528/111 |
| 3,625,918 | 12/1971 | Heer et al. | 260/47 |
| 3,639,344 | 2/1972 | Kinneman et al. | 260/47 |
| 3,823,107 | 7/1974 | Cotton | 260/23.7 |
| 4,129,670 | 12/1978 | Riew | 427/386 |
| 4,133,957 | 1/1979 | Riew | 544/357 |
| 4,218,351 | 8/1980 | Rasmussen | 260/18 N |
| 4,447,579 | 5/1984 | Takagi et al. | 525/113 |
| 4,749,748 | 6/1988 | Inaike et al. | 525/113 |

OTHER PUBLICATIONS

Hals Chemische Werke Product Information Bulletin: "TMD: Trimethyl Hexamethylene Diamine".
C. K. Riew, "Amine Terminated Reactive Liquid Polymers; Modification of Thermoset Resins", paper presented at Rubber Division Meeting, ACS, Detroit, Mich., Oct. 7–10, 1980.
DuPont Dytek ® A advertisement.

*Primary Examiner*—Frederick Krass
*Attorney, Agent, or Firm*—George W. Moxon, II; Daniel J. Hudak; Debra L. Pawl

[57] ABSTRACT

A low viscosity, diprimary amine-terminated reactive liquid polymer with low residual amine content, comprising the reaction product of a diprimary amine having the following formula

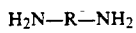

$$H_2N-R-NH_2$$

wherein $-NH_2$ is a primary terminal amine group; and wherein R is (1) a $C_4$–$C_{12}$ aliphatic chain having alkyl branches containing 2 to 4 carbons, wherein the positions of said alkyl branches within the $C_4$–$C_{12}$ aliphatic chain are such that they impart relatively different rates of reactivity to the terminal primary amine groups; or (2) a carbon to carbon backbone containing at least one non-reactive heteroatom, comprising
 (a) a $C_2$–$C_{20}$ aliphatic or cycloaliphatic moiety containing at least one tertiary amine; or
 (b) a polyoxyalkylene wherein the alkyl portion of said polyoxyalkylene contains 2 to 4 carbon atoms;

and a functional-terminated reactive liquid polymer useful as an epoxy resin modifier employed with a curing agent.

6 Claims, No Drawings

LOW VISCOSITY DIPRIMARY AMINE REACTIVE MODIFIERS FOR EPOXY RESINS

This application is a continuation of application Ser. No. 07/649,274, filed Jan. 30, 1991 for "Low Viscosity Diprimary amine Reactive Modifiers For Epoxy Resins," now abandoned, which in turn is a File Wrapper continuation application of Ser. No. 07/304,434, filed on Jan. 31, 1989, for "Low Viscosity Diprimary Amine Reactive Modifiers For Epoxy resins," by Julius Farkas, now abandoned for - LOW VISCOSITY DIPRIMARY AMINE REACTIVE MODIFIERS FOR EPOXY RESINS.

FIELD OF INVENTION

The present invention generally relates to reactive liquid polymers useful as epoxy resin modifiers employed with cure agents. More particularly, the present invention relates to low viscosity diprimary amine-terminated reactive liquid polymers (AT-RLPs) with low residual amine content made by the reaction of certain diprimary amines, in relatively low excess, with functional-terminated reactive liquid polymers, said AT-RLPs having utility as epoxy resin modifiers in combination with epoxy curing agents.

BACKGROUND AND SUMMARY OF THE INVENTION

Amine-terminated reactive liquid polymers prepared from the derivitization of functional-terminated reactive liquid polymers, and their use in modifying epoxy resins are known. For example, U.S. Pat. No. 4,133,957 discloses amine-terminated liquid polymers produced by reacting an aliphatic, alicyclic, heterocyclic or aromatic amine containing at least two secondary or mixed primary/secondary amine groups, but no more than one primary amine group per molecule, with a carboxyl-terminated, ester-terminated or acid chloride-terminated liquid polymer. Such polymers, particularly amine-terminated liquid nitrile rubbers, have found utility as epoxy resin modifiers for the purposes of toughening or flexibilizing. They have been employed with amine cure agents of choice in many different epoxy systems for a wide variety of applications ranging from adhesives to coatings to encapsulants.

However, some problems have been encountered by epoxy resin formulators when formulating with these conventional amine-terminated polymers in that they have high viscosities and relatively slow secondary amine reactivity. High viscosity polymeric modifiers are undesirable to work with because they are difficult to pour, mix and process in general. The presence of the secondary amine makes the polymer less reactive toward the epoxy.

In order to obtain a workable viscosity, such polymers would have to be made by using a large excess of a diprimary amine as disclosed in U.S. Pat. No. 3,823,107. Typically, the viscosity of the AT-RLP and the amount of excess amine which is present in the AT-RLP are inversely related: viscosity decreases as residual amine content increases. It is believed that the excess amine acts as a diluent to lower viscosity. However, a relatively large excess residual amine limits the utility of the AT-RLP to strictly that of a curing agent, because it reacts with the epoxy at a stoichiometric cure such that a co-amine modifier cannot be used. Consequently, the epoxy system cannot be modified beyond the physical property characteristics imparted by the curing agent. Therefore, an epoxy resin formulator, desirous of achieving certain physical properties, is limited by the choice of such a curing agent containing a large excess amine.

It has now surprisingly been found that a low viscosity amine-terminated reactive liquid polymer having only primary amine reactive groups and having low excess amine can be achieved by reacting certain diprimary amines, defined hereinbelow, with functional-terminated reactive liquid polymers.

Consequently, the AT-RLPs of this invention solve the above-mentioned problem traditionally encountered by users of previously known polymers of higher viscosities. The viscosity of these new modifiers can be less than half that of conventional polymers rendering them easier to handle and process. Additionally, the rate of reactivity of the primary amine terminal groups with the epoxy resin is enhanced over the previously known polymers containing secondary amine groups. Furthermore, the use of these AT-RLPs with low residual amine permits the use of a co-amine or curing agent to bring the system into stoichiometric balance. Consequently, a formulator can use these AT-RLPs in the desired quantity to achieve desired properties, such as peel strength of an adhesive, and additionally be selective with respect to a curing agent.

DETAILED DESCRIPTION OF THE PREFERRED EMBODIMENT(S)

In accordance with the present invention, a low viscosity diprimary amine-terminated reactive liquid polymer (AT-RLP) having low excess amine is provided, which is useful as an epoxy resin modifier. In another aspect, this invention provides a method of making such amine-terminated polymers. In still another aspect, this invention provides a cured epoxy composition comprising epoxy resin, the inventive AT-RLP modifier, and a curing agent.

The low viscosity AT-RLPs of this invention are the reaction product of specific diprimary amines, defined below, reacted with a functional-terminated reactive liquid polymer. The AT-RLPs have the general formula

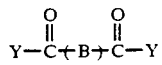

wherein Y represents the primary amine terminals of the molecule, which correspond to univalent radicals obtained by removing a hydrogen from one terminal amine group of the diprimary amines defined hereinbelow. Therefore, the amine polymers of this invention contain only two (2) reactive amine groups per molecule: each one is a primary amine capping each end of the molecule. As more fully defined below, the AT-RLPs do not contain any secondary amine groups, and any tertiary amine groups which may be present are unreactive. B represents the polymeric backbone derived from the functional-terminated reactant, namely a carboxyl-terminated or an ester-terminated polymer.

The diprimary amines which are reacted with the functional-terminated polymer, namely carboxyl-terminated or ester-terminated reactive liquid polymers, to form the AT-RLPs of this invention are ones having the following formula $$H_2N—R—NH_2$$

wherein $—NH_2$ is a primary terminal amine group; and wherein R is (1) a $C_4$–$C_{12}$ aliphatic chain having alkyl branches containing 1 to 4 carbons, wherein the positions of said alkyl branches within the $C_4$–$C_{12}$ aliphatic chain are such that they impart relatively different rates of reactivity to the terminal primary amine groups; or (2) a carbon to carbon backbone containing at least one non-reactive heteroatom, comprising
   (a) a $C_2$–$C_{20}$ aliphatic or cycloaliphatic moiety containing at least one tertiary amine; or
   (b) a polyoxyalkylene wherein the alkyl portion of the polyoxyalkylene contains 2 to 4 carbon atoms.

The $C_4$–$C_{12}$ aliphatic diprimary amines having alkyl branches containing 1 to 4 carbons are ones wherein the reactivity of the terminal primary amine groups vary with respect to each other. Although not to be construed as conclusive, it is believed that the difference in reactivity of the amine groups is attributable to the steric hindrance created by the relative positions of the alkyl branches. Consequently, the position of the branches along the carbon chain have to be such that they are closer to one terminal amine than the other so as to create a difference in reactivity of the primary amines. Thus, the alkyl branches cannot be bonded to the center carbons in the aliphatic chain so as to make the amine groups equally reactive. Any $C_4$–$C_{12}$ aliphatic diprimary amine having alkyl branches with 1 to 4 carbons, positioned as described above, is suitable for use in making the inventive AT-RLPs. The preferred ones are 2-methylpentamethylenediamine, which is commercially available as Dytek ™ A from E. I. DuPont de Nemours, Co., Wilmington, Del., U.S.A.; and trimethylhexamethylenediamine (TMHMD) or (TMD), which is commercially available from Nuodex Incorporated, Piscataway, N.J., U.S.A. The most preferred diprimary amine reactant is 2-methylpentamethylenediamine.

The other type of diprimary amine reactant has a carbon to carbon backbone containing at least one heteroatom, such as nitrogen (N), oxygen (O), or sulfur (S), which is non-reactive. One suitable backbone is that comprising a $C_2$ to $C_{20}$ aliphatic or cycloaliphatic moiety containing at least one non-reactive tertiary amine. Examples of such amines include N-N-Bis(3-aminopropyl)methylamine (BAPMA), also known as 3,3'-diamino-N-methyldipropylamine, which is commercially available from Aldrich Chemical Co., Inc., Milwaukee, Wis., U.S.A.; and 1,4-Bis(3-aminopropyl)piperazine (BAPP), also commercially available from Aldrich. Another desirable backbone is one comprising a poly(oxyalkylene), wherein the alkyl portion of the molecule contains 2 to 4 carbon atoms. Suitable poly(oxyalkylene) diamines include polyoxypropylene diamine, having the following formula $$H_2NCHCH_2[OCH_2CH]_xNH_2$$
$$\phantom{H_2NC}|\phantom{CH_2[OCH_2C}|$$
$$\phantom{H_2N}CH_3\phantom{CH_2[OCH_2}CH_3$$

wherein x is 2 to 3, which is commercially available as Jeffamine ® D-230 from Texaco Chemical Company, Bellaire, Tex., U.S.A.; and a mixed oxyethylene, oxypropylene diamine, having the following formula $$H_2NCHCH_2(OCHCH_2)_a(OCH_2CH_2)_b(OCH_2CH)_cNH_2$$
$$\phantom{H_2NC}|\phantom{CH_2(OCH}|\phantom{CH_2)_a(OCH_2CH_2)_b(OCH_2C}|$$
$$\phantom{H_2N}CH_3\phantom{CH_2(O}CH_3\phantom{CH_2)_a(OCH_2CH_2)_b(OCH_2)}CH_3$$

wherein $a+c=2.5$ and $b=8.5$, which is commercially available as Jeffamine ® ED-600 from Texaco Chemical Company.

As stated earlier, to form the inventive AT-RLP, the diprimary amine is reacted with a functional-terminated liquid polymer. The polymers are ones having either a carboxyl or ester terminal functionality.

The carboxyl-terminated liquid polymers suitably have Brookfield viscosities from about 500 cps to about 2,500,000 cps, more preferably from about 500 cps to about 1,200,000 cps, and have polymeric backbones comprising carbon-carbon linkages. The carboxyl-terminated liquid polymers may typically have carboxyl equivalent weights (gram molecular weight per carboxyl group) from about 300 to about 4,000, more preferably from about 600 to about 3,000. The carboxyl functional groups are located at least at the ends of a polymer molecule, but there may also be additional group(s) located pendant to a polymer backbone. The average number of total carboxyl groups typically may be from about 1.5 to about 4 groups per molecule, more preferably from about 1.7 to 3 groups per molecule.

The carbon-carbon backbone linkages of the carboxyl-terminated polymers typically contain polymerized units of at least one vinylidene monomer having at least one terminal $CH_2=C<$ group and selected from the group consisting of (a) monoolefins containing 2 to 14 carbon atoms, more preferably 2 to 8 carbon atoms, such as ethylene, propylene, isobutylene, 1-butene, 1-pentene, 1-hexene, 1-dodecene, and the like; (b) dienes containing 4 to 10 carbon atoms, more preferably 4 to 8 carbon atoms, such as butadiene, isoprene, 2-isopropyl-1,3-butadiene, and the like; and (c) vinyl and allyl ethers of alkyl radicals containing 1 to 8 atoms such as vinyl methyl ether, allyl methyl ether, and the like.

More preferred carboxyl-terminated liquid polymers contain polymerized units of at least one vinylidene monomer having at least one terminal $CH_2=C<$ group and are selected from the group consisting of (a) monoolefins containing 2 to 14 carbon atoms, more preferably 2 to 8 carbon atoms; (b) dienes containing 4 to 10 carbon atoms, more preferably 4 to 8 carbon atoms.

The vinylidene monomers described above may be polymerized readily with from 0% up to about 50% by weight, more preferably from 0% up to about 35% by weight, of at least one comonomer selected from the group consisting of (c) vinyl aromatics having the formula

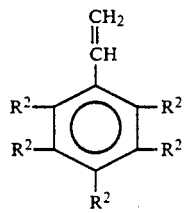

wherein $R^2$ is hydrogen, halogen or an alkyl radical containing from 1 to 4 carbon atoms such as styrene α-methyl styrene, chlorostyrene, vinyl toluene, and the like; (d) vinyl nitriles having the formula

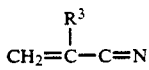

wherein $R^3$ is hydrogen or an alkyl radical containing 1 to 3 carbon atoms, such as acrylonitrile, methacrylonitrile and the like; (e) divinyls and diacrylates such as divinyl benzene, divinyl ether, diethylene glycol diacrylate, and the like; (f) amides of α, β-olefinically unsaturated carboxylic acids containing 2 to 8 carbon atoms such as acrylamide and the like; and (g) allyl alcohol and the like. Liquid Polymer compositions comprising polymerized units of a major amount of at least one vinylidene monomer listed in (a) to (e) with a minor amount of at least one comonomer listed in (f) to (j) are within the scope of this invention.

More preferred comonomers may be selected from the group consisting of vinyl aromatics having the formula

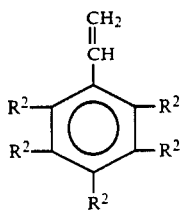

wherein $R^2$ is selected from the group consisting of hydrogen, and alkyl radicals containing 1 to 4 carbon atoms; and vinyl nitriles having the formula

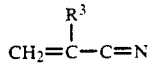

wherein $R^3$ is hydrogen or an alkyl radical containing 1 to 3 carbon atoms. Excellent results can be obtained using styrene and acrylonitrile.

Examples of useful liquid polymeric backbones comprising carbon-carbon linkages include polyethylene, polyisobutylene, polyisoprene, polybutadiene, poly(vinyl ethyl ether), as well as copolymers of butadiene and acrylonitrile; butadiene and styrene; vinyl ethyl ether and diallyl ether; vinyl ethyl ether and α-methyl styrene.

Liquid carboxyl-terminated polymers may be prepared by free-radical Polymerization using carboxyl-containing initiators and/or modifiers as disclosed in U.S. Pat. No. 3,285,949 and German Pat. No. 1,150,205 and by solution polymerization using lithium metal or organometallic compounds and post-treating the Polymers to form carboxyl groups as disclosed in U.S. Pat. Nos. 3,135,716 and 3,431,235. The polymers can also be prepared by reacting liquid polymers having other than terminal carboxyl groups with compounds so as to yield carboxyl groups. For example, liquid carboxyl-terminated polymers can be prepared from liquid hydroxyl-terminated polymers by reaction with dicarboxylic acids or their anhydrides. Liquid halogen-terminated polymers can be reacted with unsaturated anhydrides in the presence of Lewis acids to yield carboxyl groups. Thus, it is seen that the method of preparing the liquid carboxyl-terminated polymer is not critical to the invention. The essential features of the polymer are that it have at least terminal carboxyl groups and a polymeric backbone of carbon-carbon linkages.

Examples of preferred liquid carboxyl-terminated polymers include carboxyl-terminated polyethylene, carboxyl-terminated polyisobutylene, carboxyl-terminated polybutadiene, carboxyl-terminated polyisoprene, carboxyl-terminated poly(ethylacrylate), as well as carboxyl-terminated copolymers of butadiene and acrylonitrile and butadiene and styrene. Carboxyl-terminated copolymers of butadiene with acrylonitrile or styrene were found to be especially useful. These polymers may contain from about 50% to about 99% by weight of butadiene, from about 0% to about 40% by weight of acrylonitrile or styrene and from about 1% to about 15% by weight of carboxyl, based upon the total weight of polymer. They are commercially available as Hycar® reactive liquid polymers from The B. F. Goodrich Company, Cleveland, Ohio U.S.A.

The most preferred carboxyl-terminated polymers are copolymers of 1,3-butadiene/acrylonitrile with α, ω-(4-cyano-4-methyl butyric acid), which is commercially available as Hycar® 1300X8 from The B. F. Goodrich Company, Akron, Ohio, U.S.A.; and polybutadiene homopolymer α, ω-(4-cyano-4-methyl butyric acid), which is commercially available as Hycar® 2000×162 from the same company.

The carboxyl-terminated liquid polymers can be esterified with an aliphatic monohydric alcohol by methods well known to the art in order to produce ester-terminated liquid polymers. For example, a carboxyl-terminated polymer and an aliphatic monohydric alcohol can be reacted under reflux in the presence of a small amount of an acid catalyst. Suitable acid catalysts include organic acids such as monoesters and diesters of orthophosphoric acid, alkarylsulfonic acids such as p-toluenesulfonic acid, and the like; inorganic acids such as boric acid, hydrochloric acid, phosphoric acid, sulfuric acid and the like; and Lewis acids such as tetraisopropyl titanate and the like. The amount of acid catalyst used may be as little as about 0.01% up to about 5% by weight based upon total reactant weight. Suitable aliphatic monohydric alcohols for use in the esterification reaction contain from 1 to 12 carbon atoms, more preferably from 1 to 6 carbon atoms, and have boiling points below about 150° C., more preferably below about 100° C. Primary aliphatic monohydric alcohols are preferred. Examples of suitable aliphatic monohydric alcohols include alkanols containing from 1 to 6 carbon atoms, such as methanol, ethanol, 1-propanol, 1-butanol 1-pentanol, and the like. Other suitable aliphatic monohydric alcohols include 2-methoxyethanol, 2-ethoxyethanol and the like. Excellent results may be obtained using ethanol, 1-propanol or 1-butanol. Excellent results may also be obtained using methanolic or ethanolic diazomethane.

A generic description of the reaction of the diprimary amine with the functional-terminated liquid polymer is shown below:

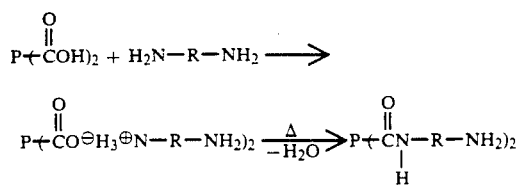

Initially a salt is formed which upon pyrolysis undergoes condensation to form amide groups. The final product is a primary amine-terminated polymer containing amide groups within the polymer backbone. The following represent reaction schemes using a carboxyl-terminated (I) and an ester terminated (II) reactive liquid polymer:

(I) 

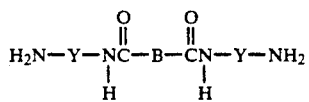

(II) 

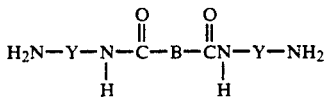

where Y represents the carbon-carbon or heterocarbon linkages within the diprimary amine and B represents the carbon-carbon linkages within the carboxyl-terminated liquid polymer. The product reactive liquid polymer has only two (2) reactive amine groups and each is a primary amine capping the end of the molecule. The AT-RLPs of this invention contain no secondary amine groups, and if one or more tertiary amines, from the reactant diprimary, are present, they are unreactive. Thus the polymers are said to be telechelic. Consequently, the rate of reaction of the inventive diprimary amine-terminated RLPs with epoxy is enhanced over previously known AT-RLPs having reactive secondary amines.

Upon completion of reaction, which is reached in a relatively short period of time, only a relatively small excess or small amount of unreacted residual amine remains. The amine-terminated adducts of this invention have only from about 4.0% to about 17.0% residual amine content, preferably from about 4% to about 13%, and most preferably from about 4% to about 9.5%. An AT-RLP with low excess amine is a major advantage to epoxy resin formulators. In addition to providing a modifier with low viscosity, the modifier can be used in conjunction with a cure agent of choice. Thus, a formulator is not limited by the properties imparted by the cure agent. As with previous modifiers, they can be used for specific desired properties in addition to a cure agent of choice. For example, those AT-RLPs made from carboxyl-terminated polymers containing a rubbery acrylonitrile/butadiene backbone are especially good for flexibilizing an epoxy adhesive.

The diprimary amine and the functional-terminated polymer are reacted at a molar ratio of from about 4 moles diamine for every 1 mole functional-terminated polymer (4:1) to about 10 moles diamine for every 1 mole functional-terminated polymer (10:1). The preferred ratios are 8:1 and 6:1, while the most preferred is 4:1.

When the AT-RLP is the reaction product of 2-methylpentamethylenediamine and 1,3-butadiene/acrylonitrile α, ω-(4-cyano-4-methylbutyric acid), generally in terms of percent by weight, from about 5% to about 25% diprimary amine is reacted with from about 75% to about 95% carboxyl-terminated polymer. Preferably, from about 12% to about 24% diprimary amine and most preferably from about 14% to 16% diprimary amine is used. It is preferred that from about 75% to about 90% and most preferably between about 83% to about 87% carboxyl-terminated polymer is used.

The temperature at which the reaction of the diprimary amine and functional terminated polymer is conducted typically ranges from about 212° F. (100° C.) to about 392° F. (200° C.), preferably from about 248° F. (120° C.) to about 356° F. (180° C.), and most preferably from about 284° F. (140° C.) to about 320° F. (160° C.).

The amine-terminated liquid polymers of this invention have relatively low viscosities, making them especially desirable for handling and formulating as an epoxy resin modifier. The viscosity of the AT-RLP generally varies depending upon the specific functional-terminated polymer reacted with the diprimary amine and the stoichiometry of the reactants. Typically, the viscosities of these amines range, in centipoise (cps), from about 73,000 to about 555,000, preferably from about 73,000, to about 300,000, and most desirably from about 73,000 to about 200,000, as measured with a Brookfield LVTD viscometer at 27° C.

A solvent is not required for the reaction, although one may be used. Suitable solvents include aliphatic and cycloaliphatic ethers containing from 3 to 10 carbon atoms, more preferably from 3 to 6 carbon atoms, such as tetrahydrofuran, diethylether and the like. Also suitable as solvents and more preferred are aromatic compounds having the formula

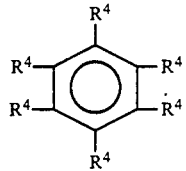

wherein $R^4$ is hydrogen, or an alkyl radical containing 1 to 3 carbon atoms, and at least two $R^4$s are hydrogen. More preferably $R^4$ is hydrogen, or an alkyl radical containing 1 to 2 carbon atoms, and at least three $R^4$s are hydrogen. Suitable aromatic solvents include benzene, toluene, O-, m- and p-xylene, o-, m- and p-diethylbenzene, cumene, mesitylene and the like. Mixtures of these solvents may also be used.

The condensation reaction of the diprimary amine and the functional-terminated polymer does not require a catalyst.

The amine-terminated reactive liquid polymers of the instant invention have utility as epoxy resin modifiers and it is expected that they will be used in combination with a curing agent.

The AT-RLPs may be used to modify any epoxy resin and conventional methods for incorporating the inventive AT-RLP modifiers into epoxy resins may be used.

The modifiers of the present invention are compatible with any epoxy curing agent, thus adding a great deal of versatility to the system. Suitable curing agent types include unmodified aliphatic polyamines, such as poly(ethylene amines) containing primary and secondary groups produced by the reaction of ammonia with either ethylene dichloride or ethylene oxide, including, for example, N-aminoethylpiperazine (AEP) and triethylenetetramine (TETA); polyamines modified so as to make, for example, adducts with epoxy resins, alkylene epoxides or acrylonitrile; amidoamines, such as the reaction product of aliphatic amines with tall oil fatty acid; polyamides, such as the reaction product of aliphatic amines with dimer acids made by Diels-Alder reaction of linoleic and oleic fatty acids; unmodified cycloaliphatic polyamines, such as polyamines with at least one amine group attached directly to a saturated ring; cycloaliphatic polyamines modified in various ways to allow complete cure at ambient temperature; unmodified aromatic polyamines, such as polyamines with amine groups attached directly to the aromatic ring; aromatic polyamines modified to allow curing to be completed at ambient temperature; carboxylic acid anhydride; borontrifluoride-amine complexes (Lewis Acid Catalysts); tertiary amines (Lewis Base Catalysts); mercaptans; and curezol imidazoles, all of which are commercially available from Pacific Anchor Chemical Corporation, Los Angeles, Calif., U.S.A.

SPECIFIC EMBODIMENTS

EXAMPLES 1-20

The following examples 1-20 demonstrate preparation of Primary amine-terminated liquid polymers from carboxyl-terminated butadiene or butadiene-acrylonitrile liquid polymers (CTP). Examples 1-14 demonstrate the inventive low viscosity AT-RLPs, while Examples 15-20 demonstrate diprimary amine-terminated polymers of high viscosities, which have been made in the same molar ratios. The carboxyl-terminated liquid polymers were prepared according to the method of U.S. Pat. No. 3,285,949. The amount of an amine required to react with a given amount of a carboxyl-terminated liquid polymer was calculated using the formula:

$$\frac{(EPHR_{COOH}) \times (MW_{amine}) \times \left(\frac{Amine}{CTP} \text{ Ratio}\right) \times (Wt. \; CTP)}{100}$$

where $EPHR_{COOH}$ = carboxyl equivalent weight per hundred parts of carboxyl-terminated liquid polymer;

$MW_{Amine}$ = molecular weight of the amine;

$\frac{Amine}{CTP}$ Ratio = desired ratio of moles of amine to equivalents of carboxyl terminated liquid polymer (CTP);

Wt. CTP = weight in grams of CTP

In each example 1-20, a one- or two-liter, three-necked flask equipped with an air stirrer, thermometer, nitrogen inlet tube, and a Dean Stark trap with a water condenser, was charged with 500 grams of a CTP, in Examples 1-14 and about 250 grams of CTP in Examples 15-20, and the appropriate amount of an amine. The mixture was heated with stirring to 155° C. using an oil bath. The flask was purged with nitrogen during the reaction The reaction Progress was monitored by periodically analyzing the reaction mixture for carboxyl content. This was accomplished by removing an aliquot, dissolving it in 60/40 toluene/isopropanol, then titrating with 0.1N ethanolic KOH to a bromothymol blue endpoint. The reaction was continued until about 80-85% conversion of carboxyl groups was attained. Viscosity was measured at 27° C. with a Brookfield LVTD viscometer. Amine equivalent weight (AEW) was determined by potentiometric titration using 0.1N ethanolic HCl as titrant. Data is presented in Table I.

Isophorone diamine (IPD) is commercially available from Nuodex Incorporated, Piscataway, N.J., U.S.A. Diethylenetriamine (DETA) is commercially available from Fisher Chemical Company, Pittsburgh, Pa., U.S.A.

The AT-RLPs of Examples 1-14 produced polymers having an excess residual amine content of from about 4.3% to about 16.8%, with the exception of Examples 11 and 12, which for unknown reasons were above this range.

TABLE I

| Ex. | CTP[1] | EPHR$_{COOH}$[2] | Wt. CTP (grams) | Amine[3] | Wt. Amine (grams) | Amine/CTP[4] (Ratio) | Reaction Time (minutes) | EPHR$_{COOH}$ | AEW[5] | Viscosity (cps) |
|-----|--------|------------------|-----------------|----------|-------------------|----------------------|-------------------------|---------------|--------|-----------------|
| 1   | 2000X162 | 0.0397 | 500   | Dytek A | 69.2  | 6 | 320 | 0.0075 | 638  | 147,600 |
| 2   | 2000X162 | 0.0397 | 500   | Dytek A | 46.1  | 4 | 315 | 0.0076 | 968  | 449,000 |
| 3   | 1300X8   | 0.0501 | 500   | Dytek A | 87.3  | 6 | 450 | 0.0076 | 507  | 146,000 |
| 4   | 1300X8   | 0.0501 | 500   | Dytek A | 58.2  | 4 | 435 | 0.0080 | 814  | 551,000 |
| 5   | 2000X162 | 0.0397 | 500   | TMHMD   | 94.1  | 6 | 285 | 0.0082 | 597  | 97,400  |
| 6   | 2000X162 | 0.0397 | 500   | TMHMD   | 62.7  | 4 | 285 | 0.0079 | 949  | 306,000 |
| 7   | 1300X8   | 0.0501 | 500   | TMHMD   | 118.7 | 6 | 420 | 0.0078 | 508  | 129,200 |
| 8   | 1300X8   | 0.0501 | 500   | TMHMD   | 79.1  | 4 | 420 | 0.0076 | 832  | 470,000 |
| 9   | 2000X162 | 0.0397 | 500   | BAPMA   | 86.5  | 6 | 310 | 0.0075 | 388  | 104,200 |
| 10  | 2000X162 | 0.0397 | 500   | BAPMA   | 57.6  | 4 | 310 | 0.0082 | 591  | 292,800 |
| 11  | 2000X162 | 0.0397 | 500   | BAPP    | 119.3 | 6 | 315 | 0.0083 | 302  | 140,000 |
| 12[6] | 2000X162 | 0.0397 | 500 | ED-600  | 357.3 | 6 | 510 | 0.0081 | 897  | 254,800 |
| 13[6] | 2000X162 | 0.0415 | 500 | D-230   | 143.2 | 6 | 600 | 0.0079 | 827  | 73,600  |
| 14  | 2000X162 | 0.0415 | 500.6 | D-230   | 95.5  | 4 | 555 | 0.0078 | 1174 | 125,000 |
| 15  | 2000X162 | 0.0415 | 250   | IPD     | 52.9  | 6 | 600 | 0.0079 | 1095 | 890,000 |
| 16  | 2000X162 | 0.0415 | 251.6 | IPD     | 35.5  | 4 | 540 | 0.0079 | 1288 | 1,238,000 |
| 17  | 1300X8   | 0.0515 | 251   | IPD     | 44.0  | 4 | 540 | 0.0084 | 943  | 3,504,000 |
| 18  | 1300X8   | 0.0515 | 227.5 | IPD     | 59.8  | 6 | 720 | 0.0082 | 754  | 1,808,000 |
| 19  | 2000X162 | 0.0415 | 252.8 | DETA    | 32.4  | 6 | 180 | 0.0093 | —    | >>10,000,000[7] |

TABLE I-continued

| Ex. | CTP[1] | EPHR$_{COOH}$[2] | Wt. CTP (grams) | Amine[3] | Wt. Amine (grams) | Amine/CTP[4] (Ratio) | Reaction Time (minutes) | EPHR$_{COOH}$ | AEW[5] | Viscosity (cps) |
|---|---|---|---|---|---|---|---|---|---|---|
| 20 | 1300X8 | 0.0515 | 231 | DETA | 37.0 | 6 | 180 | 0.0102 | — | >>10,000,000[7] |

[1]2000X162 is carboxyl-terminated butadiene liquid polymer; 1300X8 is carboxyl-terminated butadiene-acrylonitrile liquid polymer with 18% acrylonitrile content.
[2]Carboxyl equivalent weight per hundred weight parts of carboxyl-terminated liquid polymer.
[3]Dytek ™ A = 2-methylpentamethylenediamine, MW = 116.
TMHMD = Trimethylhexamethylenediamine, MW = 158.
BAPMA = N,N-Bis(3-aminopropyl)methylamine, MW = 145.
BAPP = 1,4-Bis(3-aminopropyl)piperazine, MW = 200.
ED-600 = Jeffamine ® polyoxyalkylenediamine, MW = 600.
D-230 = Jeffamine ® polyoxyalkylenediamine, MW = 230.
IPD = Isophorone diamine, MW = 170.
DETA = Diethylene triamine, MW = 103.
[4]Amine/CTP Ratio = desired ratio of moles of amine to moles of CTP.
[5]AEW = Amine equivalent weight.
[6]A 2-liter flask was used for this reaction.
[7]This reaction was terminated prior to reaching the desired endpoint due to the viscous nature of the product. Upon cooling to ambient temperature, the product was a rubbery semi-solid.

EXAMPLE 21

An attempt was made to prepare a low viscosity primary amine-terminated liquid polymer from the reaction with 1,4-diaminobutane of Hycar ® 2000×162, a carboxyl-terminated butadiene liquid polymer. 1,4-diaminobutane is commercially available from Aldrich Chemical Company, Milwaukee, Wis., U.S.A. A 500-mL three-necked flask equipped with an air stirrer, nitrogen inlet tube, thermometer, and condenser was charged with 2000×162 (132.5 grams; 0.027 mole) and 1,4-diaminobutane (48.4 grams; 0.55 mole). The mixture was heated with stirring to 115° C. using an oil bath. The flask was purged with nitrogen during the reaction. After 7 hours, most of the excess amine was distilled from the reaction mixture under reduced pressure. A Dean Stark trap with a water condenser was attached to the flask, and the mixture was heated to 155° C. while under continuous nitrogen purge. After four hours, the reaction was terminated due to the viscous nature of the adduct. Upon cooling to ambient temperature, the product was a rubbery semi-solid.

EXAMPLE 22

An attempt was made to prepare a low viscosity primary amine-terminated liquid polymer from the reaction with 1,4-diaminobutane of Hycar ® 2000×162, a carboxyl-terminated butadiene liquid Polymer. A 2000-mL three-necked flask equipped with a pressure equalizing addition funnel, an air stirrer, nitrogen inlet tube, water condenser, and thermometer, was charged with 1,4-diaminobutane (77.0 grams; 0.875 mole) and toluene (80 mL). The flask was heated to 50° C. while under continuous nitrogen purge. A solution of 2000×162 (175 grams; 0.036 mole) in toluene (600 mL) was added dropwise over 6 hours. Upon completion of addition, the solution was allowed to stir at 50° C. for an additional 30 minutes. Most of the toluene and excess amine were distilled from the solution under reduced pressure. A Dean Stark trap with water condenser was attached to the flask, and the product was heated to 140° C. while under continuous nitrogen purge. After three hours, the reaction was terminated due to the viscous nature of the adduct. Upon cooling to ambient temperature, the product was a rubbery semi-solid.

EXAMPLES 23-27

These examples demonstrate some physical property measurements on epoxy systems with an inventive AT-RLP (A), which is the reaction product of 2-methylpentamethylenediamine and a carboxyl-terminated butadiene/acrylonitrile reactive liquid polymer; and a known AT-RLP (B), which is the reaction product of 2-aminoethylpiperazine (both primary/secondary amine-terminated), and the same carboxyl-terminated butadiene/acrylonitrile reactive liquid polymer as in A.

The physical property measurements were made by mixing model adhesive recipes and casting into 8X10X0.25 inch Teflon coated aluminum molds, which were cured for one hour at 125° C. Specimens were machined from these ¼ inch plaques and tested according to ASTM D-638 for tensile strength (TEN.STG) and Percent elongation. The epoxy used was a diglycidyl ether of a bisphenol A (DGEBA). An amidoamine type cure agent was used by the name of Ancamide 50. The results, represented in Table II, show that the cured epoxy properties using the inventive AT-RLP (A) vary depending upon the amount of A used, and generally can be comparable or improved over epoxies containing equal amounts of a known amine modifier of higher viscosity. Thus, the amount of A used by a formulator will depend upon the desired properties to be achieved.

TABLE II

| | Example | | | | |
|---|---|---|---|---|---|
| | 23 | 24 | 25 | 26 | 27 |
| Epoxy | 100 | 100 | 100 | 100 | 100 |
| Filler | 40 | 40 | 40 | 40 | 40 |
| AT-RLP A | — | 15 | 25 | — | — |
| AT-RLP B | — | — | — | 15 | 25 |
| Cure Agent | 35.8 | 31.5 | 28.7 | 34.7 | 34 |
| TEN. STG. MPa | 46.3 | 43.8 | 44 | 44 | 41 |
| Elongation % | 1.7 | 1.97 | 3.44 | 2.04 | 3.35 |

Although the invention has been described in terms of specific embodiments of a manner in which the invention may be practiced, this is by way of illustration only and the invention is not necessarily limited thereto since alternative embodiments and operating techniques will become apparent to those skilled in the art. Accordingly, modifications are contemplated which can be made without departing from the spirit of the described invention.

What I claim is:

1. A low viscosity, diprimary amine-terminated reactive liquid polymer having a low residual amine content, comprising:
    the reaction product of about 4 moles of a diprimary amine and about one mole of a carboxyl-terminated or an ester-terminated reactive liquid polymer, said polymer comprising one or more of polyethylene, polyisobutylene, polybutadiene, polyisoprene, poly(vinyl ethyl ether), poly(ethyl acrylate), copolymers of butadiene and acrylonitrile, copolymers of butadiene and styrene, or copolymers of vinyl ethyl ether and α-methyl styrene, wherein said diprimary amine has the formula

H$_2$N—R—NH$_2$ wherein NH$_2$ is a primary terminal amine group and wherein R is a C4-C12 aliphatic chain having alkyl branches containing 1 to 4 carbons wherein the positions of said alkyl branches within the C4-C12 aliphatic chain are such that they impart relatively different rates of reactivity resulting from steric hindrance of the terminal primary amine groups, and wherein the amine-terminated reactive liquid polymer has a viscosity of from about 73,000 to about 555,000 centipoise at 27° C. and a residual amine content of from about 4.0 percent to about 17.0 percent by weight.

2. The polymer of claim 1 wherein the carboxyl-terminated or ester-terminated reactive liquid polymer is a carboxyl-terminated copolymer of butadiene and acrylonitrile.

3. The polymer of claim 2 wherein the carboxyl-terminated polymer is 1,3- butadieneacrylonitrile α, ω-(4-cyano-4-methyl butyric acid).

4. The polymer of claim 3 wherein the diprimary amine is present in an amount, by weight, of from about 5% to about 25% and the carboxyl-terminated polymer is present in an amount of from about 75% to about 95%.

5. The polymer of claim 4 wherein the viscosity, in centipoise, is from about 73,000 to about 200,000.

6. The polymer of claim 5 wherein the residual amine content is from about 4% by weight to about 9.5% by weight.

* * * * *